US012585959B2

(12) United States Patent
Arik et al.

(10) Patent No.: US 12,585,959 B2
(45) Date of Patent: **\*Mar. 24, 2026**

(54) FRAMEWORK FOR LEARNING TO TRANSFER LEARN

(71) Applicant: Google LLC, Mountain View, CA (US)

(72) Inventors: Sercan Omer Arik, San Francisco, CA (US); Tomas Jon Pfister, Foster City, CA (US); Linchao Zhu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/455,182

(22) Filed: Aug. 24, 2023

(65) Prior Publication Data

US 2024/0054345 A1     Feb. 15, 2024

Related U.S. Application Data

(63) Continuation of application No. 16/945,880, filed on Aug. 2, 2020.

(60) Provisional application No. 62/881,989, filed on Aug. 2, 2019.

(51) Int. Cl.
  *G06N 3/08*          (2023.01)
  *G06N 3/04*          (2023.01)
  *G06N 3/096*         (2023.01)

(52) U.S. Cl.
  CPC .................................. *G06N 3/096* (2023.01)

(58) Field of Classification Search
  None
  See application file for complete search history.

(56) References Cited

U.S. PATENT DOCUMENTS

| | | | |
|---|---|---|---|
| 2019/0172230 A1 | 6/2019 | Mailhe et al. | |
| 2020/0104710 A1 | 4/2020 | Vasudevan et al. | |
| 2021/0019630 A1* | 1/2021 | Yao ........................ | G06N 3/047 |
| 2021/0142177 A1 | 5/2021 | Mallya et al. | |
| 2021/0256369 A1* | 8/2021 | Ardel .................... | G06N 3/088 |

OTHER PUBLICATIONS

"Learning to Transfer," arXiv, Wei et al.; Wei. (Year: 2017).*
"Reinforcement Learning," Wikipedia (Year: 2020).*
"Learning to Transfer," arXiv, Wei et al.; Wei (Year: 2019).*

(Continued)

*Primary Examiner* — Michael J Huntley
*Assistant Examiner* — Paul J Breene
(74) *Attorney, Agent, or Firm* — Shumaker & Sieffert, P.A.

(57)     ABSTRACT

A method includes receiving a source data set and a target data set and identifying a loss function for a deep learning model based on the source data set and the target data set. The loss function includes encoder weights, source classifier layer weights, target classifier layer weights, coefficients, and a policy weight. During a first phase of each of a plurality of learning iterations for a learning to transfer learn (L2TL) architecture, the method also includes: applying gradient decent-based optimization to learn the encoder weights, the source classifier layer weights, and the target classifier weights that minimize the loss function; and determining the coefficients by sampling actions of a policy model. During a second phase of each of the plurality of learning iterations, determining the policy weight that maximizes an evaluation metric.

16 Claims, 5 Drawing Sheets

(56)          References Cited

OTHER PUBLICATIONS

International Search Report and Written Opinion for related Application PCT/US2020/044687, dated Aug. 2, 2020, 14 pages.
Ge Weifeng et al: "Borrowing Treasures from the Wealthy: Deep Transfer Learning through Selective Joint Fine-Tuning", 2017 IEEE Conference on Computer Vision and Pattern Recognition (CVPR), IEEE Computer Society, US, Jul. 21, 2017 (Jul. 21, 2017), pp. 10-19, XP033249335, ISSN: 1063-6919, Doi: 10.1109/CVPR. 2017.9 [retrieved on Nov. 6, 2017], 20 pages.
Jiquan Ngiam et al: "Domain Adaptive Transfer Learning with Specialist Models", arxiv.org, Cornell University Library, 201 Olin Library Cornell University Ithaca, NY 14853, Nov. 16, 2018 (Nov. 16, 2018), XP081000129, abstract; figure 1 1. Introduction 3.3. Domain adaptive transfer learning by importance weights, 10 pages.
Linchao Zhu et al: "Learning to Transfer Learn: Reinforcement Learning-Based Selection for Adaptive Transfer Learning", arxiv. org, Cornell University Library, 201 Olin Library Cornell University Ithaca, NY 14853, Jul. 16, 2020 (Jul. 16, 2020), XP081703641, abstract; figure 1, 19 pages.
Notice of Allowance from U.S. Appl. No. 16/945,880 dated Apr. 23, 2025, 9 pp.

* cited by examiner

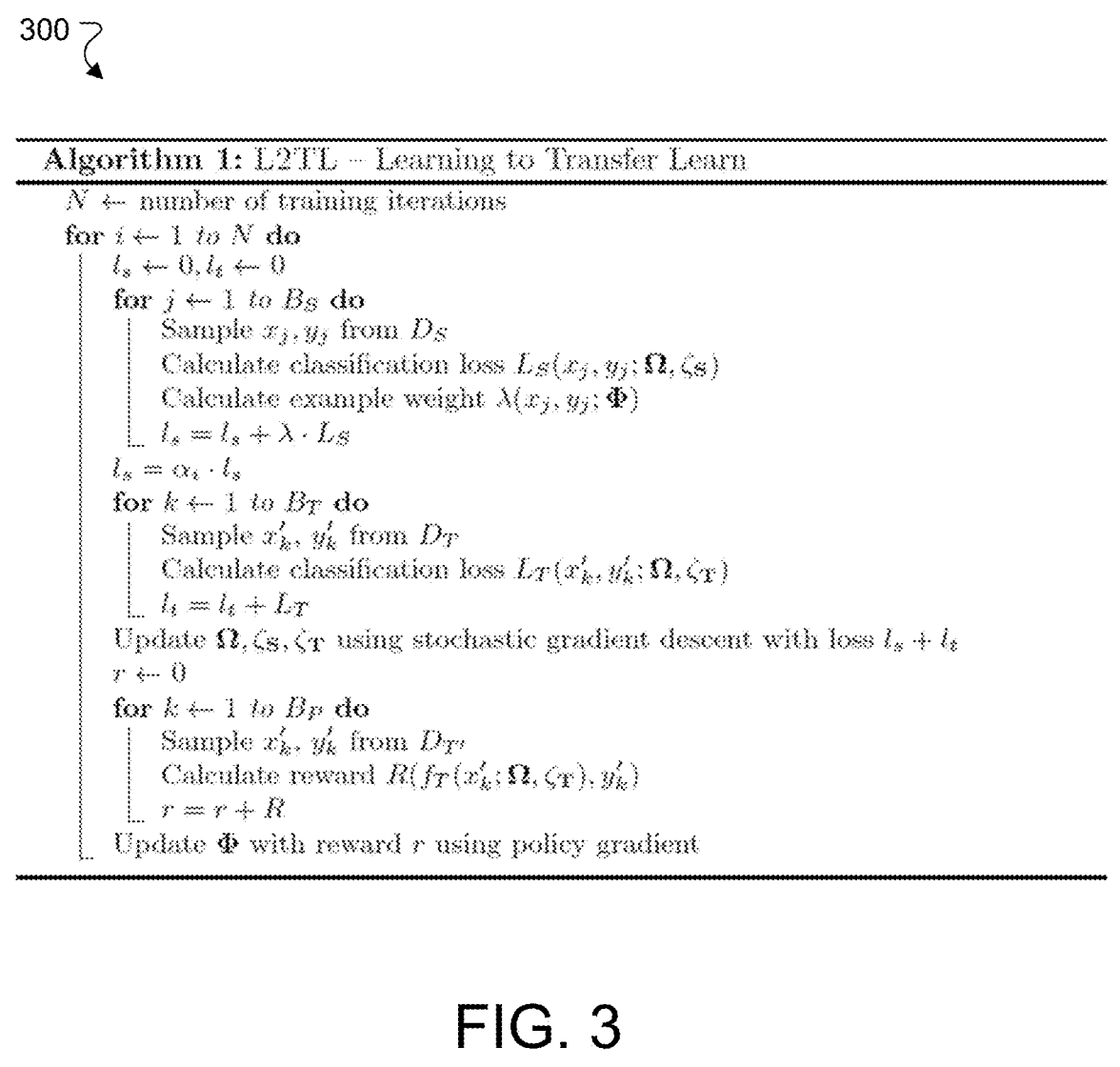

300

Algorithm 1: L2TL – Learning to Transfer Learn $N \leftarrow$ number of training iterations for $i \leftarrow 1$ to $N$ do $l_s \leftarrow 0, l_t \leftarrow 0$ for $j \leftarrow 1$ to $B_S$ do Sample $x_j, y_j$ from $D_S$ Calculate classification loss $L_S(x_j, y_j; \Omega, \zeta_S)$ Calculate example weight $\lambda(x_j, y_j; \Phi)$ $l_s = l_s + \lambda \cdot L_S$ $l_s = \alpha_i \cdot l_s$ for $k \leftarrow 1$ to $B_T$ do Sample $x'_k, y'_k$ from $D_T$ Calculate classification loss $L_T(x'_k, y'_k; \Omega, \zeta_T)$ $l_t = l_t + L_T$ Update $\Omega, \zeta_S, \zeta_T$ using stochastic gradient descent with loss $l_s + l_t$ $r \leftarrow 0$ for $k \leftarrow 1$ to $B_P$ do Sample $x'_k, y'_k$ from $D_{T'}$ Calculate reward $R(f_T(x'_k; \Omega, \zeta_T), y'_k)$ $r = r + R$ Update $\Phi$ with reward $r$ using policy gradient

FIG. 3

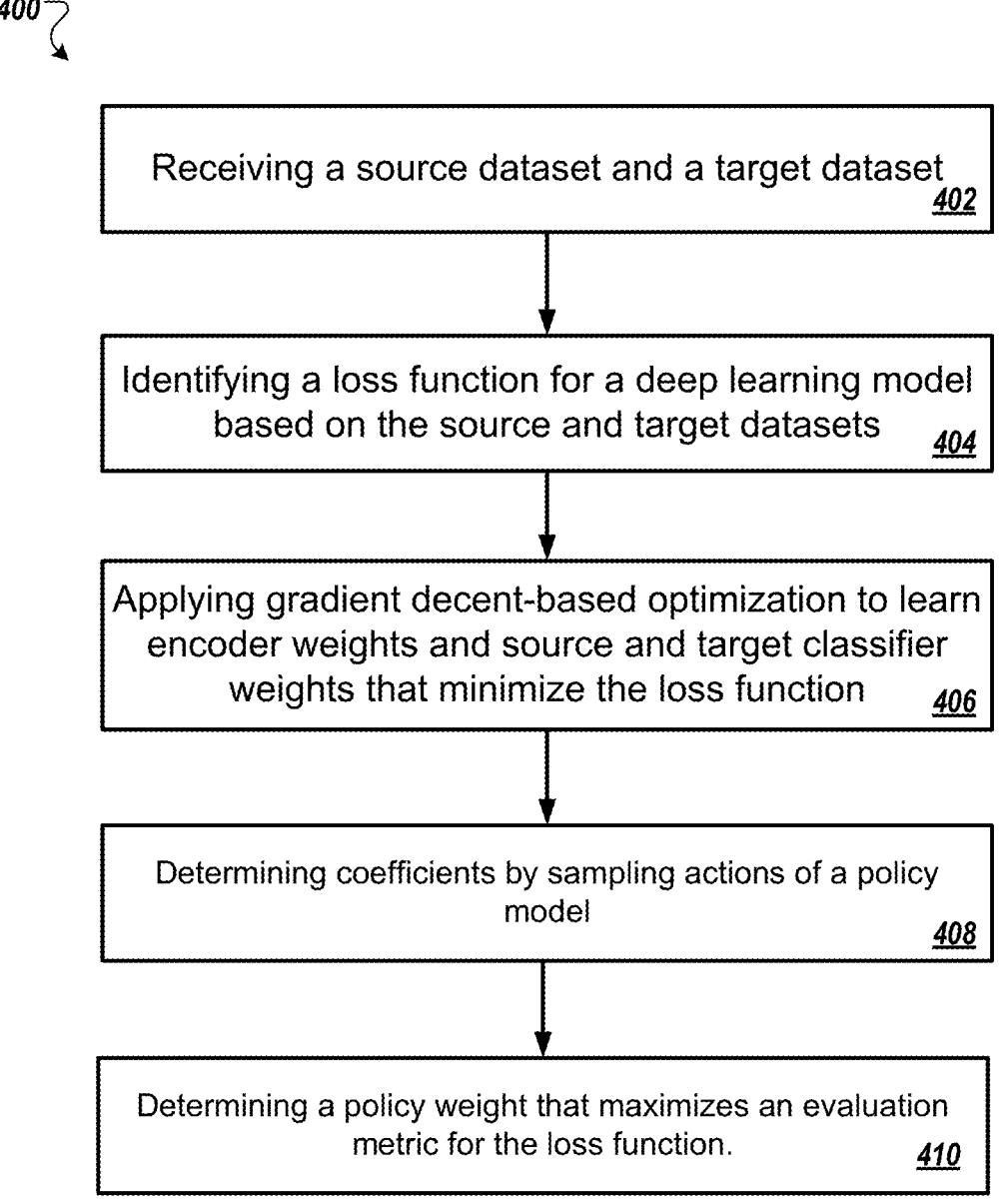

400

Receiving a source dataset and a target dataset
402

Identifying a loss function for a deep learning model based on the source and target datasets
404

Applying gradient decent-based optimization to learn encoder weights and source and target classifier weights that minimize the loss function
406

Determining coefficients by sampling actions of a policy model
408

Determining a policy weight that maximizes an evaluation metric for the loss function.
410

FIG. 4

FRAMEWORK FOR LEARNING TO TRANSFER LEARN

CROSS REFERENCE TO RELATED APPLICATIONS

This U.S. patent application is a continuation of, and claims priority under 35 U.S.C. § 120 from, U.S. patent application Ser. No. 16/945,880, filed on Aug. 2, 2020, which claims priority under 35 U.S.C. § 119(e) to U.S. Provisional Application 62/881,989, filed on Aug. 2, 2019. The disclosures of these prior applications are considered part of the disclosure of this application and are hereby incorporated by reference in their entireties.

TECHNICAL FIELD

This disclosure relates to a framework for learning to transfer learn.

BACKGROUND

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

One aspect of the disclosure provides a method of adaptively learning a weight assignment for a deep learning model that is jointly optimized for a source dataset and a target dataset. The method includes receiving, at data processing hardware, the source data set and the target data set, and identifying, by the data processing hardware, a loss function for a deep learning model based on the source data set and the target data set. The loss function includes encoder weights, source classifier layer weights, target classifier layer weights, coefficients, and a policy weight. During a first phase of each of a plurality of learning iterations for a learning to transfer learn (L2TL) architecture configured to learn weight assignments for the deep learning model, the method also includes: applying, by the data processing hardware, gradient decent-based optimization to learn the encoder weights, the source classifier layer weights, and the target classifier layer weights that minimize the loss function; and determining, by the data processing hardware, the coefficients by sampling actions of a policy model. During a second phase of each of the plurality of learning iterations for the L2TL architecture, the method also includes determining, by the data processing hardware, the policy weight that maximizes an evaluation metric for the loss function.

Implementations of the disclosure may include one or more of the following optional features. In some implementations, determining the policy weight that maximizes the evaluation metric for the loss function includes using the encoder weights and the target classification layer weights learned during the first phase. The policy model may be fixed while performing the first phase of the learning iteration. The policy model may include a reinforcement learning-based policy model. The evaluation metric for the loss function may quantify performance of the deep learning model on a target evaluation dataset that includes a subset of data samples in the target dataset that were not previously seen by the deep learning model.

In some examples, during the first phase of each of the plurality of learning iterations, the method also includes: sampling, by the data processing hardware, a training batch of source data samples from the source data set having a particular size; and selecting, by the data processing hardware, the source data samples from the training batch of source data samples that have the N-best confidence scores for use in training the deep learning model to learn the encoder weights, the source classifier layer weights, and the target classifier layer weights that minimize the loss function. In additional examples, during the second phase of each of the plurality of learning iterations, the method also includes training, by the data processing hardware, the policy model using policy gradient on a target evaluation dataset to compute a reward that maximizes the evaluation metric. In these additional examples, determining the policy weight that maximizes the evaluation metric for the loss function is based on the computed reward.

In some implementations, the source data set includes a first plurality of images and the target data set includes a second plurality of images. Here, a number of images in the first plurality of images of the source data set may be greater than a number of images in the second plurality of images of the target data set. The L2TL architecture may include an encoder network layer, a source classifier layer, and a target classifier layer.

Another aspect of the disclosure provides a system for adaptively learning a weight assignment for a deep learning model that is jointly optimized for a source dataset and a target dataset. The system includes data processing hardware and memory hardware in communication with the data processing hardware of a user device. The memory hardware stores instructions that when executed on the data processing hardware cause the data processing hardware to perform operations that include receiving the source data set and the target data set and identifying a loss function for a deep learning model based on the source data set and the target data set. The loss function includes encoder weights, source classifier layer weights, target classifier layer weights, coefficients, and a policy weight. During a first phase of each of a plurality of learning iterations for a learning to transfer learn (L2TL) architecture configured to learn weight assignments for the deep learning model, the operations also include: applying gradient decent-based optimization to learn the encoder weights, the source classifier layer weights, and the target classifier layer weights that minimize the loss function; and determining the coefficients by sampling actions of a policy model. During a second phase of each of the plurality of learning iterations for the L2TL architecture, the operations also include determining the policy weight that maximizes an evaluation metric for the loss function.

This aspect may include one or more of the following optional features. In some implementations, determining the policy weight that maximizes the evaluation metric for the loss function includes using the encoder weights and the target classification layer weights learned during the first phase. The policy model may be fixed while performing the first phase of the learning iteration. The policy model may include a reinforcement learning-based policy model. The evaluation metric for the loss function may quantify performance of the deep learning model on a target evaluation dataset that includes a subset of data samples in the target dataset that were not previously seen by the deep learning model.

In some examples, during the first phase of each of the plurality of learning iterations, the operations also include: sampling a training batch of source data samples from the source data set having a particular size; and selecting the source data samples from the training batch of source data samples that have the N-best confidence scores for use in training the deep learning model to learn the encoder weights, the source classifier layer weights, and the target classifier layer weights that minimize the loss function. In additional examples, during the second phase of each of the plurality of learning iterations, the operations also include training the policy model using policy gradient on a target evaluation dataset to compute a reward that maximizes the evaluation metric. In these additional examples, determining the policy weight that maximizes the evaluation metric for the loss function is based on the computed reward.

In some implementations, the source data set includes a first plurality of images and the target data set includes a second plurality of images. Here, a number of images in the first plurality of images of the source data set may be greater than a number of images in the second plurality of images of the target data set. The L2TL architecture may include an encoder network layer, a source classifier layer, and a target classifier layer.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a schematic view of an example learning to transfer learn algorithm depicting first and second phases of each of the plurality of learning iterations for updating the weights of a deep learning model.

FIG. 4 is an example arrangement of operations for a method of adaptively learning a weight assignment for a deep learning model that is jointly optimized for a source dataset and a target dataset.

Like reference symbols in the various drawings indicate like elements.

DETAILED DESCRIPTION

Figure 1:
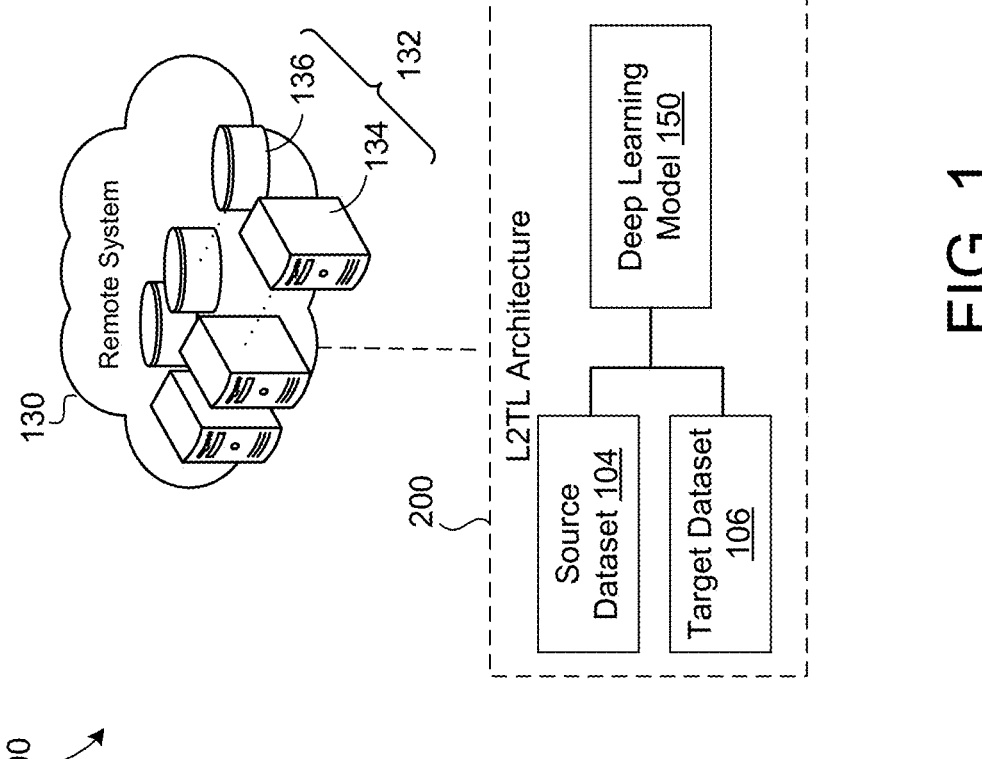
FIG. 1 is a schematic view of a system including a learning to transfer learn (L2TL) architecture and a deep learning model jointly optimized for a source dataset and a training dataset.

Deep neural networks excel at understanding images, text, and audio. The performance of deep neural networks improves significantly with more training data. As the applications diversify and span use cases with small training datasets, conventional training approaches are often insufficient to yield high performance. It becomes highly beneficial to utilize extra source datasets and "transfer" the relevant information to the target dataset. Transfer learning, commonly in the form of obtaining a pre-trained model on a large-scale source dataset and then further training it on the target dataset (known as fine-tuning), has become the standard recipe for most real-world artificial intelligence applications. Compared to training from random initialization, fine-tuning yields considerable performance improvements and convergence speedup, as demonstrated for object recognition, semantic segmentation, language understanding, speech synthesis, audio-visual recognition, and language translation.

Implementations herein are directed toward a learn to transfer learn (L2TL) architecture executing on data processing hardware for improving transfer learning on a target dataset by judicious extraction of information from a source dataset. As opposed to transfer learning techniques that use a fixed weighting assignment function to measure the relatedness between the source domain and the target domain, the L2TL architecture can adaptively learn a weight assignment for a deep learning model that is jointly optimized for a source dataset and a target dataset. As will become apparent, the learning of the adaptive weights for the deep learning model may be guided by performance of the deep learning model on a target evaluation dataset. Specifically, the performance can be quantified using a target performance metric, whereby the L2TL architecture can directly target relatedness for a goal of improvement in target evaluation performance.

While optimizing for the importance weighting function, one option for the choice of scaling coefficients is to alternate them between (1, 0) and (0, 1). This would train the source dataset until convergence with optimized policy weight $\hat{\Phi}$ and then train the target dataset until convergence with the pre-trained weights from the source dataset. In some implementations, the framework optimizes a single coefficient as the optimization in scale invariant. The policy optimization step is decoupled from gradient-descent based optimization for the trainable parameters and the signal is shared between them.

Implementations are directed toward using two phases in each of a plurality of learning iterations for the L2TL architecture. During the first phase for each of the plurality of learning iterations, the L2TL architecture applies gradient decent-based optimization to learn encoder weights, source classifier layer weights, and target classifier weights that minimize a loss function for the L2TL architecture, and also determines coefficients by sampling actions of a policy model. The policy model may be fixed during the first phase. In some cases, the loss might be skewed when most of the source dataset samples in a batch are unrelated, while some batches contain more related examples. To ease this problem, the L2TL architecture can sample a larger batch and dynamically select more related examples. At each iteration, the L2TL architecture can sample a training batch having a particular size and use a number of the top samples with the highest confidence scores for training. This approach can yield computational benefits as the gradients would not be computed for most source dataset samples until convergence.

During the second phase for each of the plurality of learning iterations, the L2TL architecture optimizes a policy weight $\hat{\Phi}$ that maximizes an evaluation metric on a target evaluation dataset using the encoder weights learned during the first phase. This can be treated as an RL problem such that the policy model outputs the actions for an importance weighting function and a single coefficient towards optimization of a reward. When training the policy model, the L2TL architecture can use policy gradient to maximize the reward on the target dataset using a batch having a particular size. The L2TL architecture can use a moving average baselines to reduce variance. The L2TL architecture can use reinforcement learning to compute the policy gradient. The L2TL architecture can also use a gradient-based optimization of stochastic objective, e.g., an Adam optimizer, to optimize the policy gradient.

Referring to FIG. 1, in some implementations, a system 100 includes a computing environment 130 including resources 132, such as data processing hardware 134 (e.g., server(s) or CPU(s) and/or remote memory hardware 136 storing instructions that when executed on the data processing hardware 102 cause the data processing hardware 102 to perform operations. A learning to transfer learn (L2TL) architecture 200 and a deep learning model 150 may reside on the resources 132. Generally, the deep learning model 150 includes a deep learn network, i.e., a machine learning model, including multiple layers of models to generate an output for a received input. In the example shown, the deep learning model 150 is jointly optimized for a source dataset 104 and a target dataset 106 L2TL architecture 200 is configured to adaptively learn weight assignments for the deep learning model 150.

Figure 2:
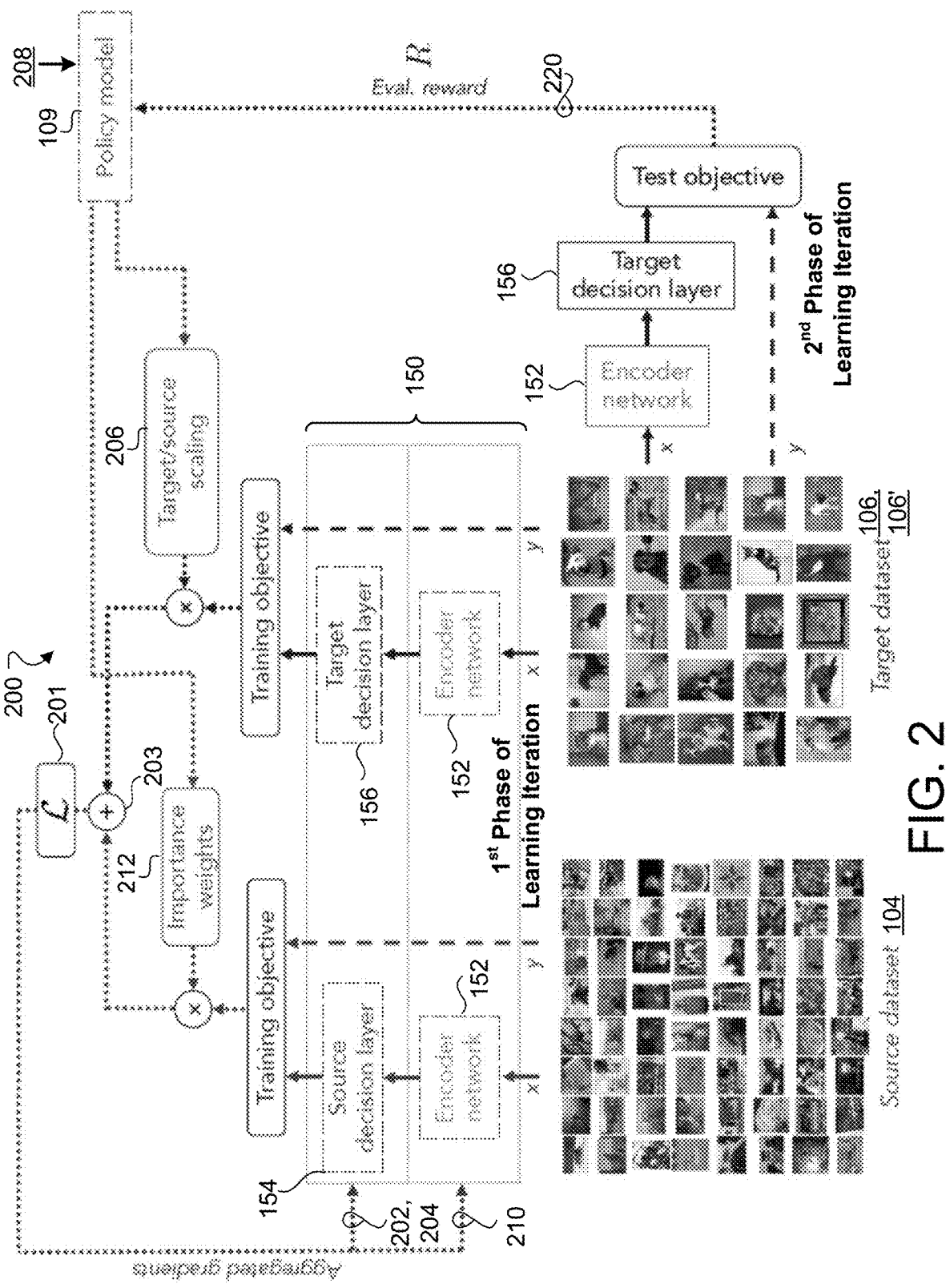
FIG. 2 is a schematic view of an example learning to transfer learn architecture for improving transfer learning on a target dataset by judicious extraction of information from a source dataset.

FIG. 2 shows an example of the L2TL architecture 200 executing on the data processing hardware 134 and receiving the source data set 104 and the target dataset 106. The source data set 104 includes a first plurality of images and the target dataset 106 includes a second plurality of images. The first plurality of images of the source dataset 104 includes a greater number of images than the second plurality of images of the target dataset 106. In other implementations, the source dataset 104 and the target dataset 106 include data samples other than images, such as, without limitation, audio samples or text samples. The target dataset 106 includes a specialized set of training samples, e.g., images that include dogs, for training the deep learning model 150 to perform a specialized target task, e.g., recognize images that contain dogs. The source dataset 104, however, may include a very-large scale public dataset for images spanning various classes that may or may not include dogs. Notably, the source and target datasets 104, 106 may each be labeled. There are cases that source samples in the source dataset 104 could have features that are implicitly relevant to the target samples in the target dataset 106 and would benefit the learning process, but they may belong to different classes. For example, consider an example where the deep learning model 150 is trained to perform classification for bird images. The source dataset 104 may not contain bird images, but may have airplane images with similar visual patterns that would aid the training of the bird classifier as they share similar visual patterns to learn valuable representations of the raw data. The L2TL architecture 200 is designed to automatically handle such cases with its policy learning, and can push the performance further in ways that manual source dataset selection or fixed domain similarity methods may not be able to. The L2TL architecture 200 considers cooperative optimization of deep learning models 150 for source and target tasks, while using adaptive weights 202, 204, 208, 210 for scaling of constituent loss terms. Dashed boxes in the L2TL architecture 200 of FIG. 2 correspond to trainable functions.

The L2TL architecture 200 is configured to improve transfer learning on the target dataset 106 by judicious extraction of information from the source dataset 104. The L2TL architecture 200 is configured to identify a loss function 201 for the deep learning network 150 based on the source dataset 104 and the target dataset 106. The loss function 201 may include encoder weights 210 associated with an encoder neural network 152 of the deep learning model 150, source classifier layer weights 202 associated with a source classifier layer 154 of the deep learning model 150, target classifier layer weights 204 associated with a target classifier layer 156 of the deep learning model 150, coefficients 206 for the source and target datasets 104, 106, and a policy weight 208 associated with a policy model 209 of the deep learning model 150. The loss function 201 may be expressed as follows.

$$\mathcal{L} = \alpha_s[i] \cdot \sum_{j=1}^{B_S} \lambda(x_j, y_j; \Phi) \cdot L_S(f_S(x_j; \Omega, \zeta_S), y_j) + \tag{1}$$

$$\alpha_t[i] \cdot \sum_{k=1}^{B_T} L_T(f_T(x_k'; \Omega, \zeta_T), y_k'),$$

where $(x, y)$ are the input and output pairs, $B_S$ and $B_T$ are the source and target batch sizes, $\alpha_s[i]$ and $\alpha_t[i]$ are the scaling coefficients 206 at ith iteration, $\lambda$ is an importance weighing function 212, $f_S(\bullet;\Omega,\zeta_S)$ and $f_T(\bullet;\Omega,\zeta_T)$ are encoding functions for the source and the target datasets 104, 106 with trainable parameters $\Omega$ (encoding weights 210), $\zeta_S$ (source classifier layer weights 202), and $\zeta_T$ target classifier layer weights 204). As will become apparent, the learning goal of the loss function 201 expressed by Equation (1) is generalizing to an unseen target evaluation dataset 106', via a maximization of a performance metric, R, 220.

During a first phase for each of a plurality of learning iterations for the L2TL architecture 200, the L2TL architecture 200 applies gradient decent-based optimization to learn the encoder weights $\Omega$ 210, the source classifier layer weights $\zeta_S$ 202, and the target classifier layer weights $\zeta_T$ 204 that minimize the loss function 201, and determines the coefficients 206 by sampling actions of the policy model 209. For instance, applying gradient descent-based optimization to learn the adaptable weights $\Omega$ 210, $\zeta_S$ 202, and $\zeta_T$ that minimizes the loss function 201 may be represented by the following equation.

$$\hat{\Omega}, \hat{\zeta}_S, \hat{\zeta}_T = \text{argmin}_{\Omega, \zeta_S, \zeta_T} \mathcal{L}(\hat{\Phi}; \Omega, \zeta_S, \zeta_T) \tag{2}$$

During the first phase, the policy model 209 remains fixed. Although most batches would contain relevant samples from the source dataset 104, the loss function 201 might be skewed if most of source dataset samples in a batch are irrelevant (and would ideally get lower weights). To ease this problem, the first phase may use larger batch sizes at each iteration and dynamically select the most relevant examples therefrom. At each iteration, the L2TL architecture samples a training batch of size $M_S \cdot B_S$, and uses the top $B_S$ of those with the highest weights for training updates during that iteration. This approach also yields computational benefits as the gradients would not be computed for most source dataset samples until convergence.

FIG. 2 shows the L2TL architecture 200 having a training objective during the first phase of the learning iteration for each of the source and target datasets 104, 106 that includes minimizing gradients between respective inputs x of the source and target datasets 104, 106 and their corresponding labels/outputs y. Here, the encoding network 152 encodes input features (e.g., images) from the source dataset 104 and the source classifier layer 154 (also referred to as "source decision layer") uses the encoded input features to output a confidence score, whereby the training objective determines a source dataset classification loss (which corresponds to the first term $L_S(f_S(x_j;\Omega,\zeta_S),y_j$ in Eq. (1) of the loss function 201) between the confidence score for the input features and the corresponding labels/outputs y. The source dataset classification loss is multiplied by the importance weights 212, which correspond to $\lambda(x_j,y_j;\Phi)$ in Eq. (1) of the loss function 201, before a summing function 203 aggregates a target dataset classification loss (which corresponds to the second term $L_T(f_T(x'_k;\Omega,\zeta_T),y'_k)$ in Eq. 1 of the loss function 201) with the product of the source dataset classification loss and the importance weights 212 to determine aggregate gradients for the loss function 201. Based on the aggregated gradients of the loss function of each iteration, the L2TL architecture 200 determines/updates each of the encoder weights $\Omega$ 210, source classifier layer weights $\zeta_S$ 202, and the target classifier layer weights $\zeta_T$ 204 until convergence of the source dataset 103.

The encoding network 152 also encodes input features (e.g., images) from the target dataset 106 and the target classifier layer 156 (also referred to as "source decision layer") uses the encoded features to output a confidence score, whereby the training objective determines determines the target dataset classification loss, $L_T(f_T(x'_k;\Omega,\zeta_T),y'_k)$, between the confidence score for the input features and the corresponding labels/outputs y for the target dataset. As mentioned above, the summing function 203 aggregates the target dataset classification loss with the product of the source dataset classification loss and the importance weights 208 to determine the aggregate gradients for the loss function 201.

During the second phase for each of a plurality of learning iterations for the L2TL architecture 200, the L2TL architecture 200 determines the policy weight $\Phi$ 208 that maximizes an evaluation metric, R, 220 for the loss function 201. Here, the L2TL architecture 200 determines the policy weight $\Phi$ 208 that maximizes the evaluation metric, R, 220 using the encoder weights $\Omega$ 210 and the target classifier layer weights $\zeta_T$ 204 learned during the first phase. As used herein, the evaluation metric (also referred to as 'evaluation metric') 220 for the loss function quantifies performance of the deep learning model 150 (i.e., the encoder network 152 and the target classification layer 154) on the target evaluation dataset 106'. In some examples, the target evaluation dataset 106' includes a subset of data samples (e.g., images) in the target dataset 106 that were not previously seen by the deep learning model 150 during the first phase of training. Accordingly, determining the policy weight $\Phi$ 208 includes optimizing the policy weight 208 to maximize the evaluation metric $R_{D'T}$ 220 on the target evaluation dataset 106' may be represented as follows.

$$\max_{\Phi} R_{D'_T}(\hat{\Omega}, \zeta_S, \zeta_T; \Phi). \qquad (3)$$

Where $D'_T$ is the unseen target evaluation dataset 106' that may include a subset of data samples (input features x, output labels y) in the target dataset 106 that were not previously seen by the deep learning model 150 during the first phase. While the policy model 209 is fixed during the first phase, during the second phase, the L2TL architecture 200 trains the policy model 209 using policy gradient on the target evaluation dataset 106' to compute a reward that maximizes the evaluation metric 220 using Eq. 3. Accordingly, L2TL architecture 200 determines/updates the policy weight $\Phi$ 208 that maximizes the evaluation metric, R, 220 based on the computed reward. Based on the updated policy weight $\Phi$ 208, the importance weights 212 applied as a multiplier to the source dataset classification loss to be determined during the first phase of a subsequent learning iteration are updated by sampling the actions of policy model 209. Thus, the L2TL architecture 200 employs the policy model 209 to learn the encoder weights $\Omega$ 210, source classifier layer weights $\zeta_S$ 202, and the target classifier layer weights $\zeta_T$ 204 and determines/updates the policy weight $\Phi$ 208 that maximizes the evaluation metric, R, 220 on the target evaluation dataset 106'. As a result, the L2TL architecture 200 goes beyond targeting general relatedness by directly targeting relatedness for the specific goal of improving performance for a target evaluation dataset 106'. FIG. 3 provides an example L2TL algorithm depicting the first and second phases of each of the plurality of learning iterations for updating the weights $\Omega$ 210, $\zeta_S$ 202, $\zeta_T$ 204, and $\Phi$ 208.

Effectively, the policy model 209 outputs the importance weights 212 adaptively for each of a multitude of classes of the source dataset 104, thereby enabling the L2TL architecture 200 to learn source dataset class weights to directly optimize performance of the target dataset 106. With adaptive assignment of the importance weights 212, the L2TL architecture 200 assigns higher weights to more relevant data samples in the source dataset 104 such that relevant information from the source dataset 104 can be extracted for training the deep learning model 150 to learn a target objective. The policy model 209 may include reinforcement learning-based policy model. Moreover, in some examples, the L2TL architecture 200 yields ranking of samples of the source dataset 104 based on their contributions to a target task.

FIG. 4 provides a flowchart of an example arrangement of operations for a method 400 of adaptively learning a weight assignment for a deep learning model 150 that is jointly optimized for a source dataset 104 and a target dataset 106. The data processing hardware 134 (FIG. 1) may perform the operations for the method 400 by executing instructions stored on memory hardware 136 (FIG. 1). At operation 402, the method 400 includes receiving the source dataset 104 and the target dataset 106. At operation 404, the method 400 includes identifying a loss function 201 for the deep learning model 150 based on the source data set 104 and the target data set 106. The loss function 201 includes encoder weights 210, source classifier layer weights 202, target classifier layer weights 204, coefficients 206, and a policy weight 208.

During a first phase of each of a plurality of learning iterations for a learning to transfer learn (L2TL) architecture 200 configured to learn weight assignments for the deep learning model 150, the method 400 also includes: applying gradient decent-based optimization to learn the encoder weights, the source classifier layer weights, and the target classifier weights that minimize the loss function at operation 406; and determining the coefficients 206 by sampling actions of a policy model 209 at operation 408. During a second phase of each of the plurality of learning iterations for the L2TL architecture 200, the method 400 also includes, at operation 410, determining the policy weight 208 that maximizes an evaluation metric 220 for the loss function 201.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
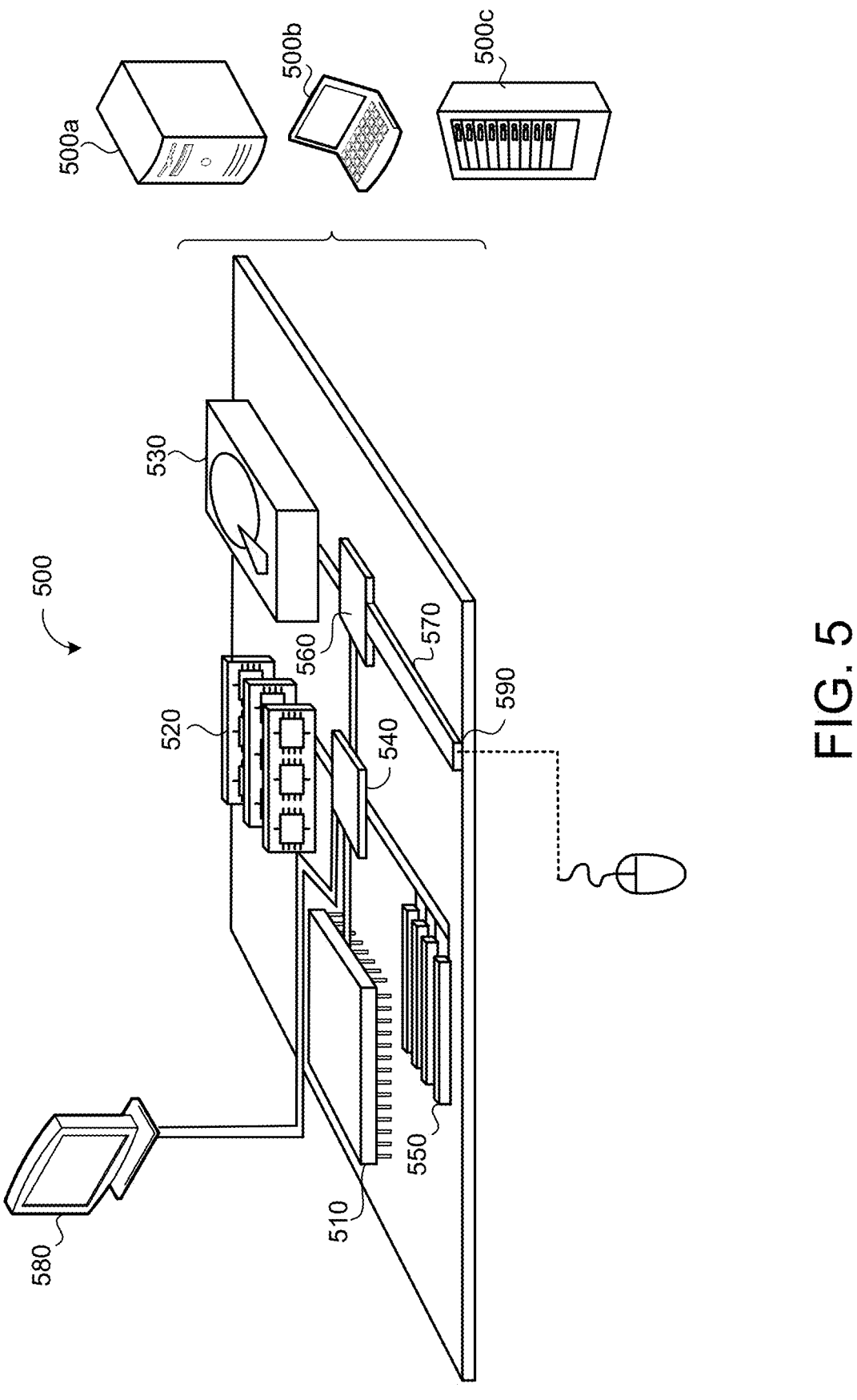
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device (e.g., memory hardware) 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system). The processor 510 may correspond to the data processing hardware 134 of FIG. 1 and execute the L2TL architecture 200 and the deep learning model 150.

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:
1. A method comprising:
obtaining, by a computing system, a source dataset comprising source images of a first class;
obtaining, by the computing system, a target dataset comprising target images of a second class, the second class different than the first class; and
at each respective learning iteration of a plurality of learning iterations for a learning to transfer learn (L2TL) architecture:

training, by the computing system, a deep learning model on the source dataset and the target dataset using a loss function for transfer learning, the loss function comprising:
a source dataset classification loss based on source classifier layer weights and encoder weights;
a target dataset classification loss based on target classifier layer weights and the encoder weights;
a source scaling coefficient;
a target scaling coefficient; and
a policy weight associated with a policy model;
while training the deep learning model:
sampling, by the computing system, a training batch of the source images from the source dataset;
sampling, by the computing system, a training batch of the target images from the target dataset;
applying, by the computing system, the policy model to the training batch of source images to assign a respective importance weight to each source image from the training batch of source images;
determining, by the computing system, and based on each respective importance weight assigned to each source image, the source dataset classification loss for the respective learning iteration;
determining, by the computing system, and based on each target image from the training batch of target images, the target dataset classification loss for the respective learning iteration;
determining, by the computing system, the source scaling coefficient and the target scaling coefficient for the respective learning iteration by using the policy model to sample an action; determining, by the computing system, based on the loss function, and based on the source dataset classification loss, the target dataset classification loss, the source scaling coefficient, and the target scaling coefficient for the respective learning iteration, a loss for the respective learning iteration; and
applying, by the computing system, and using the loss for the respective learning iteration, gradient descent-based optimization to update the source classifier layer weights, the target classifier layer weights, and the encoder weights that minimize the loss function; and
updating, by the computing system, the policy weight associated with the policy model to maximize an evaluation metric indicative of a performance of the deep learning model on a target evaluation dataset.
2. The method of claim 1, wherein the policy model comprises a reinforcement learning-based policy model.
3. The method of claim 1, wherein the L2TL architecture comprises an encoder network layer, a source classifier layer, and a target classifier layer.
4. The method of claim 1, wherein the L2TL architecture and the deep learning model reside at a remote computing environment.
5. The method of claim 1, wherein the source scaling coefficient comprises an iteration-dependent source scaling coefficient.
6. The method of claim 1, wherein the target scaling coefficient comprises an iteration-dependent target scaling coefficient.
7. The method of claim 1, wherein the policy model is fixed while performing a first phase of each respective learning iteration of the plurality of learning iterations.
8. The method of claim 7, wherein the method further comprises, during a second phase of each respective learning iteration of the plurality of learning iterations, training the policy model using a policy gradient on the target evaluation dataset to compute a reward that maximizes the evaluation metric.

9. A system comprising:

data processing hardware; and memory hardware in communication with the data processing hardware, the memory hardware storing instructions that, when executed on the data processing hardware, cause the data processing hardware to:

obtain a source dataset comprising source images of a first class;

obtain a target dataset comprising target images of a second class, the second class different than the first class; and at each respective learning iteration of a plurality of learning iterations for a learning to transfer learn (L2TL) architecture:

train a deep learning model on the source dataset and the target dataset using a loss function for transfer learning, the loss function comprising:

a source dataset classification loss based on source classifier layer weights and encoder weights;

a target dataset classification loss based on target classifier layer weights and the encoder weights;

a source scaling coefficient;

a target scaling coefficient; and a policy weight associated with a policy model;

while training the deep learning model:

a training batch of the source images from the source dataset;

sample a training batch of the target images from the target dataset;

apply the policy model to the training batch of source images to assign a respective importance weight to each source image from the training batch of source images;

determine, based on each respective importance weight assigned to each source image, the source dataset classification loss for the respective learning iteration;

determine, based on each target image from the training batch of target images, the target dataset classification loss for the respective learning iteration;

determine the source scaling coefficient and the target scaling coefficient for the respective learning iteration by using the policy model to sample an action; determine, based on the loss function, and based on the source dataset classification loss, the target dataset classification loss, the source scaling coefficient, and the target scaling coefficient for the respective learning iteration, a loss for the respective learning iteration; and apply, using the loss for the respective learning iteration, gradient descent-based optimization to update the source classifier layer weights, the target classifier layer weights, and the encoder weights that minimize the loss function; and updating the policy weight associated with the policy model to maximize an evaluation metric indicative of a performance of the deep learning model on a target evaluation dataset.

10. The system of claim 9, wherein the policy model comprises a reinforcement learning-based policy model.

11. The system of claim 9, wherein the L2TL architecture comprises an encoder network layer, a source classifier layer, and a target classifier layer.

12. The system of claim 9, wherein the L2TL architecture and the deep learning model reside at a remote computing environment.

13. The system of claim 9, wherein the source scaling coefficient comprises an iteration-dependent source scaling coefficient.

14. The system of claim 9, wherein the target scaling coefficient comprises an iteration-dependent target scaling coefficient.

15. The system of claim 9, wherein the policy model is fixed while performing a first phase of each respective learning iteration of the plurality of learning iterations.

16. The system of claim 15, wherein the instructions further cause the data processing hardware to, during a second phase of each respective learning iteration of the plurality of learning iterations, training the policy model using a policy gradient on the target evaluation dataset to compute a reward that maximizes the evaluation metric for the loss function.

* * * * *